Patented Sept. 19, 1933

1,927,108

UNITED STATES PATENT OFFICE 1,927,108

PROCESS FOR PREPARING ALKALI METAL FLUORIDES

Max Zimmermann, Leverkusen-on-the-Rhine, Germany, assignor to I. G. Farbenindustrie Aktiengesellschaft, Frankfort - on - the - Main, Germany, a corporation of Germany No Drawing. Application December 16, 1929, Serial No. 414,594, and in Germany December 20, 1928

8 Claims. (Cl. 23—89)

The present invention relates to a process for preparing alkali metal fluorides and especially those of sodium and potassium.

The process consists in treating solid alkali metal chlorides with gaseous hydrofluoric acid at different temperatures.

By the treatment of solid alkali metal chloride with gaseous hydrofluoric acid alkali metal bifluorides are obtained which by thermal decomposition or by treatment at an elevated temperature yield the corresponding alkali metal monofluorides.

The process is considerably simplified by causing the gaseous hydrofluoric acid to act in excess on a solid alkali metal chloride at a temperature below about 50° C., preferably at 15° C. An anhydrous alkali metal fluoride in a liquid state is formed, hydrochloric acid being eliminated. This liquid represents an alkali metal fluoride containing some mols (about 6) of hydrofluoric acid loosely bound; by heating this liquid firstly alkali metal bifluoride and then alkali metal mono-fluoride are obtained, the escaping hydrofluoric acid being re-employed in the process.

For example, on treating sodium chloride in form of layers in a tube with gaseous hydrofluoric acid by passing the latter over or through the layers of the sodium chloride at room temperature, say about 15° C., gaseous hydrochloric acid is evolved, and sodium bifluoride is formed. When the same operation is carried out at a somewhat higher temperature, say at about 80°–120° C., the neutral fluoride is obtained. The latter is likewise produced when the initially obtained sodium bifluoride is heated to a temperature of about 100° C. or above.

In the same manner potassium chloride yields potassium bifluoride, on treatment with gaseous hydrofluoric acid at room temperature. At temperatures about 50°–100° higher than the corresponding temperatures for the sodium chloride, neutral potassium fluoride is obtained which is likewise produced by thermal decomposition of the initially obtained potassium bifluoride. The decomposition temperature lies at about 150° C. and above.

The mixtures of hydrofluoric acid and hydrochloric acid formed during the decomposition can be used for the preparation of fluorides.

The term "alkali metal fluorides" used in this application and especially in the claims is intended to comprise monofluorides, bifluorides as well as additive compounds consisting of fluorides and hydrofluoric acid and also mixtures of these compounds.

I claim:

1. Process for the manufacture of alkali metal fluorides comprising treating a solid alkali metal chloride with gaseous hydrofluoric acid at temperatures between about 0° and 200° C.

2. Process for the manufacture of liquid alkali-metal polyfluorides comprising treating a solid alkali metal chloride with an excess of gaseous hydrofluoric acid at about 15° C.

3. Process for the manufacture of liquid alkali metal polyfluorides comprising treating a solid alkali metal chloride with an excess of gaseous hydrofluoric acid at temperatures between 0° and 50° C.

4. Process for the manufacture of liquid sodium polyfluoride comprising treating solid sodium chloride with an excess of gaseous hydrofluoric acid at temperatures between 0° and 50° C.

5. Process for the manufacture of liquid potassium polyfluoride comprising treating solid potassium chloride with an excess of gaseous hydrofluoric acid at temperatures between 0° and 50° C.

6. Process for the manufacture of alkali metal monofluoride comprising treating a solid alkali metal chloride with an excess of gaseous hydrofluoric acid at temperatures between 0° and 50° C. and heating the resulting liquid alkali metal polyfluoride until the excess hydrofluoric acid is split off.

7. Process for the manufacture of sodium monofluoride comprising treating solid sodium chloride with an excess of gaseous hydrofluoric acid at temperatures between 0° and 50° C. and heating the resulting liquid sodium polyfluoride until the excess hydrofluoric acid is split off.

8. Process for the manufacture of potassium monofluoride comprising treating solid potassium chloride with an excess of gaseous hydrofluoric acid at temperatures between 0° and 50° C. and heating the resulting liquid potassium polyfluoride until the excess hydrofluoric acid is split off.

MAX ZIMMERMANN.